United States Patent [19]
Kosako et al.

[11] Patent Number: 5,212,509
[45] Date of Patent: May 18, 1993

[54] WATERPROOF CAMERA HAVING A, MOVABLE LENS, BARREL AND COVER

[75] Inventors: Kosei Kosako; Takeo Kobayashi, both of Tokyo, Japan

[73] Assignee: Asahi Kogaku Kogyo Kabushiki Kaisha, Tokyo, Japan

[21] Appl. No.: 715,899

[22] Filed: Jun. 19, 1991

Related U.S. Application Data

[63] Continuation of Ser. No. 581,633, Sep. 12, 1990, abandoned.

[30] Foreign Application Priority Data

Feb. 27, 1990 [JP] Japan ................................ 2-19328[U]

[51] Int. Cl.⁵ ........................ G03B 17/08; H04N 7/18
[52] U.S. Cl. ........................................ 354/64; 358/99
[58] Field of Search ............................ 354/64; 358/99

[56] References Cited

U.S. PATENT DOCUMENTS 4,763,145 9/1988 Takamura et al. .................. 354/64

FOREIGN PATENT DOCUMENTS 62-246027 10/1987 Japan .
62-246028 10/1987 Japan .

*Primary Examiner*—Michael L. Gellner
*Assistant Examiner*—Cassandra C. Spyrou
*Attorney, Agent, or Firm*—Sandler Greenblum & Bernstein

[57] ABSTRACT

A waterproof camera having an opening which is formed in a stationary barrel of a camera body and in which a photographing lens barrel is movable in an optical axis direction. A movable waterproofing cover is movable in an optical axis direction to a waterproof position and a non-waterproof position and which is provided on its front end with a transparent waterproof member. A securing device secures the waterproofing cover to the stationary barrel when the waterproofing cover is positioned at the waterproof position, and an annular seal member establishes a watertight connection between the opening and the waterproofing cover when the waterproofing cover is secured to the stationary barrel at the waterproof position.

13 Claims, 3 Drawing Sheets

WATERPROOF CAMERA HAVING A, MOVABLE LENS, BARREL AND COVER

This application is a continuation, division, of application No. 07/581,633, filed Sep. 12, 1990, now abandoned.

BACKGROUND OF THE INVENTION

1. Field of the Invention

The present invention relates to a waterproof and more precisely it relates to a waterproof camera having a photographing lens barrel which is movable in the optical axis direction of the camera.

2. Description of Related Art

A water-resistant camera which does not allow drips of rain or water to go in the camera in the rain or on the shore, or a waterproof camera which can take pictures even in shallow water, for example in a swimming pool or in seawater near the edge of a beach, are available on the market.

There is an attempt to realize a zoom camera which is waterproof and/or water-resistant. One solution is to provide a transparent waterproof cover which covers the photographing lens barrel, which is movable in the optical axis direction, in a watertight fashion. The photographing lens barrel moves in the transparent waterproof cover.

However, in the watertight mechanism, the shape of the transparent waterproof cover is determined, taking into account the largest displacement of the photographing lens barrel at the zooming position. Accordingly, a large transparent waterproof cover is required, resulting in a large waterproof camera.

SUMMARY OF THE INVENTION

The primary object of the present invention is to provide a waterproof camera in which a watertight function is provided only when it is needed.

According to one of the most significant features of the present invention, a waterproof cover which is normally accommodated in the opening comes out of the opening only when the waterproof function is required.

To achieve the object mentioned above, according to the present invention, there is provided a waterproof camera, comprising an opening which is formed in a stationary barrel of a camera body and in which a photographing lens barrel is movable in an optical axis direction, a waterproofing cover which is coaxial to the photographing lens and which is movable in the optical axis direction independently from the photographing lens barrel to a projected waterproof position and a non-water proof position, the waterproofing cover being provided on its front end with a transparent waterproof member, a securing means for securing the waterproofing cover to the stationary barrel in the projected waterproof position, and a sealing means which establishes a watertight connection between the opening and the waterproofing cover when the waterproofing cover is secured by the securing means at the projected waterproof position.

With this arrangement, the photographing lens barrel is covered and protected by the waterproofing cover and the stationary barrel in a water tight fashion only when the waterproofing function thereof is required.

Preferably, the waterproofing cover is movable together with the photographing lens barrel when the water proof cover is positioned at a non-waterproof position. To this end, for example, the photographing lens barrel is provided on its front end with a male thread portion, and the waterproofing cover is provided on its front inner periphery with a female thread portion which can be engaged by the male thread portion of the photographing lens barrel to make the waterproofing cover integral with the photographing lens barrel when a waterproof function is not necessary.

Preferably, the securing means is simply composed of a male thread portion which is provided on a rear end of the outer periphery of the waterproofing cover in the optical axis direction and a female thread portion which is provided on the inner periphery of the stationary barrel in the vicinity of the opening. The securing means is also possible to be compose of a bayonet mount mechanism which is per se known as a connection mechanism of a single lens reflex camera body and an interchangeable lens barrel.

In an embodiment of the present invention, the waterproofing cover is provided on its outer periphery with an annular groove, so that the annular seal member is fitted in the annular groove. The seal member comes into close contact with the inner periphery of the opening only when the waterproofing cover projects to the waterproof position.

According to another aspect of the present invention, there is provided a camera comprising a camera body having an opening, a photographing lens barrel which is movable in the optical axis direction through the opening of the camera body, and a movable barrel which is provided on its front end with a transparent member and which is movable in the optical axis direction in a space between the outer periphery of the photographing lens barrel and the opening.

Preferably, the movable barrel comprises a first securing means for securing the movable barrel to the opening and a second securing means for securing the latter to the photographing lens barrel. With this arrangement, the movable barrel is secured to the opening and the photographing lens barrel when the movable barrel is positioned at a waterproof position and a non-waterproof position, respectively.

Preferably, a seal member is provided to establish a watertight connection between the outer periphery of the movable barrel and the inner periphery of the opening when the movable barrel is integrally connected to the inner periphery of the opening at the waterproof position.

BRIEF DESCRIPTION OF DRAWINGS

The invention will be described below in detail with reference to the accompanying drawings, in which.

DESCRIPTION OF THE PREFERRED EMBODIMENTS

Figure 4:
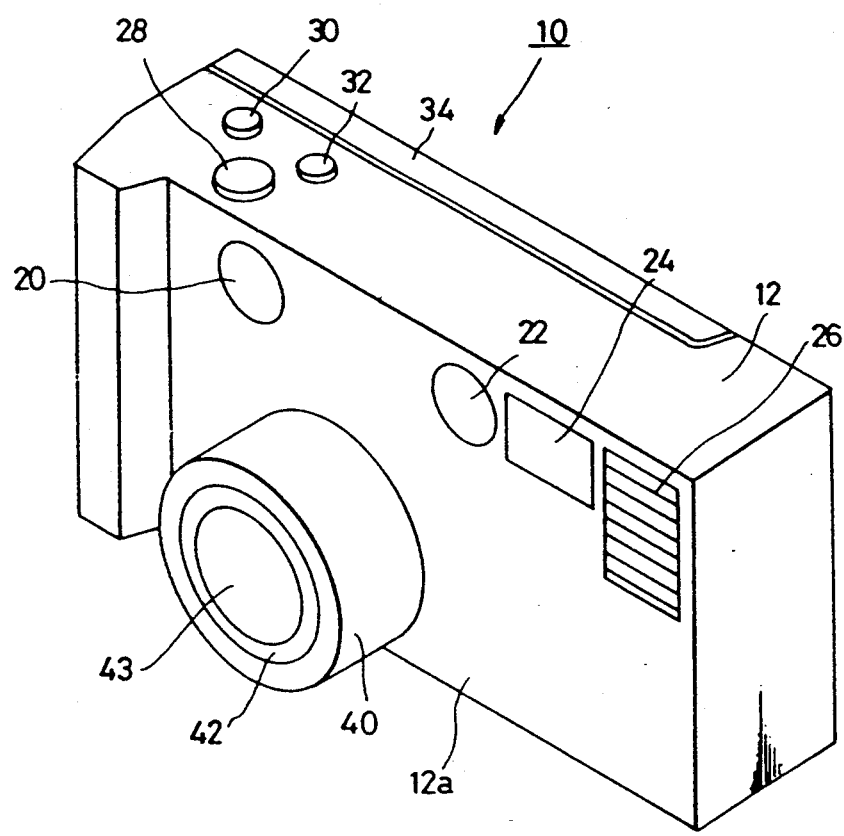

FIG. 4 illustrates of a waterproof camera 10 according to the present invention by way of example. The camera 10 has a watertight camera body 12 which has a watertight stationary barrel 40 mounted to a front face 12a of the camera body 12. The stationary barrel 40 has an opening 40a through which a zoom photographing lens barrel 14 (FIG. 1) retractably projects. The photographing lens barrel 14 is movable in the optical axis direction 0 of the camera by a pair of zoom switches 30 and 32 to effect the zooming operation.

The camera body 12 is provided on its upper face with a release button 28 and on its back with an openable back cover 34, respectively. On the front wall 12a of the camera body 12 are provided a light emission window 20 through which infrared rays of light are emitted to detect an object distance, a light receiving window 22 which receives light reflected from an object to be taken, an objective window 24 of a finder, and a strobe light emitting window 26.

Figure 1:
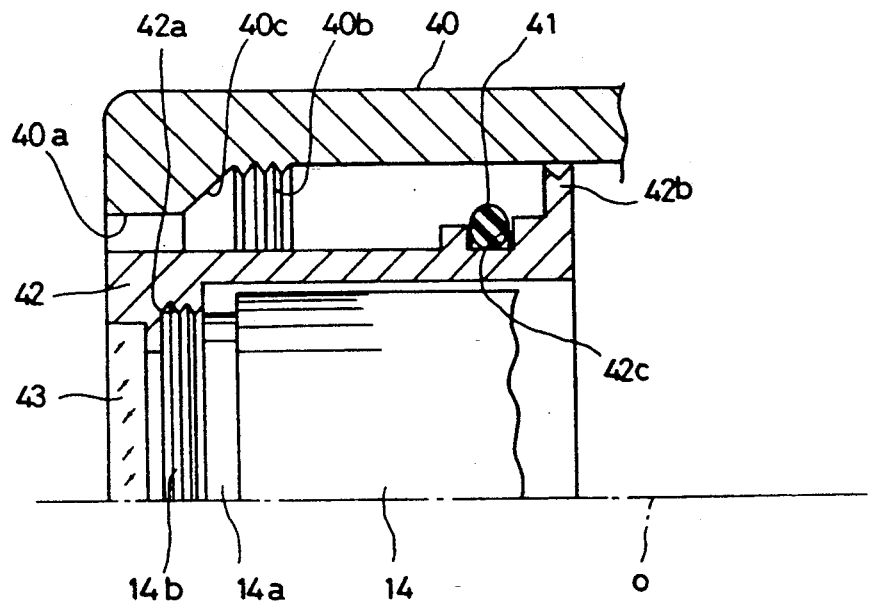
FIG. 1 is a side sectional view of a main part of a waterproof camera according to the present invention, shown in a non-waterproof position in which a photographing lens barrel is retracted.

As can be seen in FIG. 1, a cylindrical waterproofing cover 42 is provided in the stationary barrel 40. The waterproofing cover 42 is positioned between the photographing lens barrel 14 and the stationary barrel 40 and is movable in the optical axis direction. The waterproofing cover 42 is provided on its front end with a waterproofing glass 43 mounted thereto in a water tight fashion. A female thread portion 42a is formed on the inner periphery of the waterproofing cover 42 inside the waterproofing glass 43. A male thread portion 42b is provided on the outer periphery of the waterproofing cover 42 at the rear end thereof. The waterproofing cover 42 is provided on its outer periphery with an annular groove 42c in front of the male thread portion 42b, so that an annular seal member 41 is fitted in the annular groove 42c.

The stationary barrel 40 is provided on its inner periphery with an inclined guide surface 40c which is continuously connected to the opening 40a and a female thread portion 40b which is connected to the inclined guide surface 40c. The female thread portion 40b is engageable with the male thread portion 42b of the cover 42.

The photographing lens barrel 14 has at the front end thereof a smaller diameter portion 14a and a male thread portion 14b which is engageable with the female thread portion 42a of the cover 42.

Figure 2:
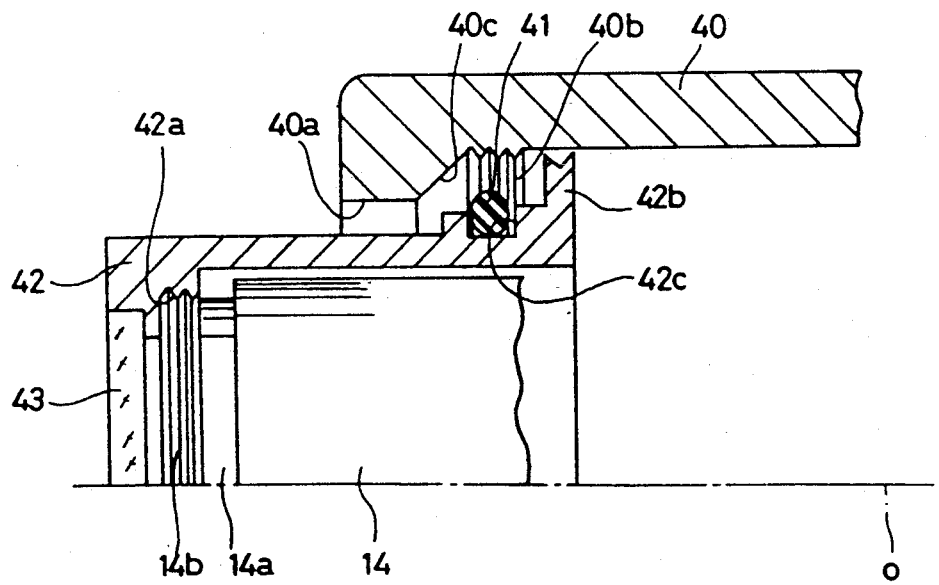
FIG. 2 is a side sectional view of a main part of a waterproof camera of FIG. 1, shown in a non-waterproof position in which a photographing lens barrel is projected.
Figure 3:
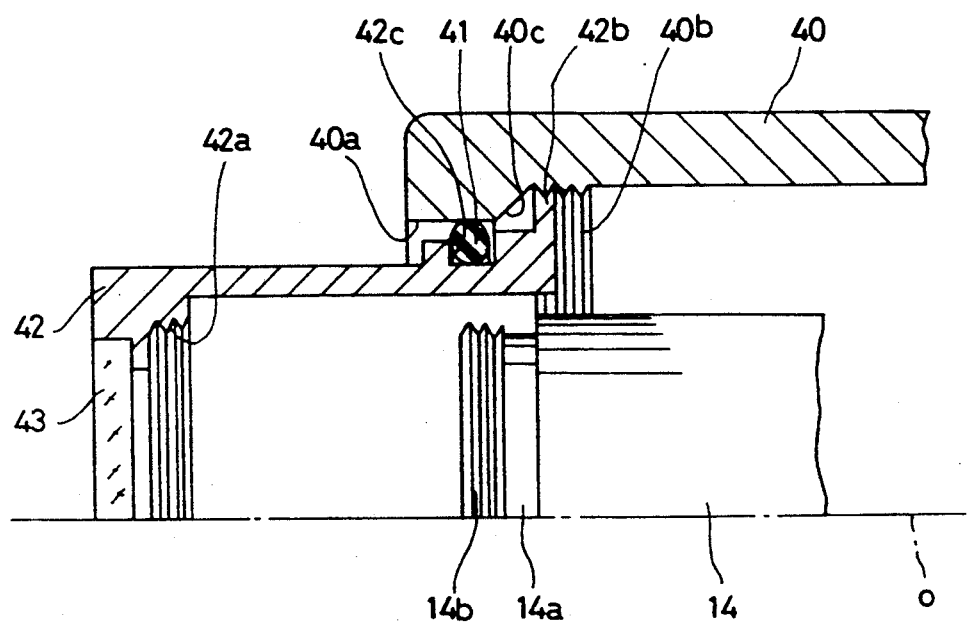
FIG. 3 is a side sectional view of a main part of a waterproof camera, shown in a waterproof position in which the photographing lens barrel is covered by a waterproofing cover in a watertight fashion, according to the present invention; and, FIG. 4 is a perspective view of a waterproof camera to which the present invention is applied.

In the waterproof camera as constructed above, when no waterproof function is necessary, the female thread portion 42a is screw-engaged by the male thread portion 14b of the photographing lens barrel 14. Consequently, the waterproofing cover 42 moves in the optical axis direction 0 together with the photographing lens barrel 14 without relative movement therebetween, as shown in FIGS. 1 and 2.

On the other hand, when the camera is used in the rain or on the shore, for example, where the waterproof function is required, the waterproofing cover 42 is rotated in a direction to disengage the female thread portion 42a thereof from the male thread portion 14b of the photographing lens barrel 14. When the female thread portion 42a is disengaged from the male thread portion 14b, the waterproofing cover 42 is free to move relative to the photographing lens barrel 14. The waterproofing cover 42 is moved to project forwardly relative to the photographing lens barrel 14 and stationary barrel 40 into a frontmost position. In this state, the waterproofing cover 42 is rotated in the opposite direction to engage the male thread portion 42b thereof with the female thread portion 40b. As a result, the waterproofing cover 42 is integrally connected to the stationary barrel 40. During the rotation of the water proof cover 42, the annular seal member 41 fitted in the annular groove 42c of the waterproofing cover 42 moves forwardly while being in slide contact at the outer periphery of the seal member 41 with the inclined guide surface 40c of the stationary barrel 40, and finally, the seal member 41 is moved into the opening 40a and comes into press or close contact with the inner periphery of the opening 40a. In particular, the seal member 41 establishes a water tight connection between the opening 40a and the waterproofing cover 42. In this state, the photographing lens barrel 14 is covered and protected in watertight fashion by the stationary barrel 40 and the waterproofing cover 42 and is movable in the optical axis direction to effect a zooming operation.

We claim:

1. A camera comprising:
    an opening which is formed in a stationary barrel of a camera body and in which a photographing lens barrel is movable in said opening in an optical axis direction;
    a waterproofing cover which is movable in the optical axis direction independently from said photographing lens barrel to a projected waterproof position and a non-waterproof position, said cover being provided on its front end with a transparent waterproof member, said waterproofing cover being secured to and movable together with the photographing lens barrel when the waterproofing cover is positioned at the non-waterproof position;
    thread means for securing the waterproofing cover to the stationary barrel when the waterproofing cover is positioned at the waterproof position; and
    a sealing means which establishes a watertight connection between the opening and the waterproofing cover when the waterproofing cover is secured by the securing means at the waterproof position.

2. A camera according to claim 1, wherein said thread means comprises a male thread portion which is provided on a rear end of an outer periphery of the waterproofing cover in the optical axis direction and a female thread portion which is provided on an inner periphery of the stationary barrel in the vicinity of the opening.

3. A camera according to claim 1, wherein said waterproofing cover is provided on its outer periphery with an annular groove.

4. A camera according to claim 3, wherein said sealing means is fitted in the annular groove of the waterproofing cover, so that only when the waterproofing cover is positioned at the waterproof position, the seal member comes into close contact with an inner periphery of the opening.

5. A camera according to claim 2, wherein said photographing lens barrel is provided on its front end with a male thread portion, and wherein said waterproofing cover is provided on its front inner periphery with a female thread portion which can be engaged by the male thread portion of the photographing lens barrel to make the waterproofing cover integral with the photographing lens barrel.

6. A camera comprising:
    a stationary barrel having an opening;

a photographing lens barrel which is movable in the optical axis direction through the opening of the stationary barrel; and a movable barrel which is provided on its front end with a transparent member and which is movable independently from said photographing lens barrel in the optical axis direction in a space between the outer periphery of the photographing lens barrel and the opening of the stationary barrel to a projected waterproof position and a non-waterproof position, said movable barrel being secured to and movable together with the photographing lens barrel when the movable barrel is positioned at the non-waterproof position, said movable barrel being secured to said photographing lens barrel by thread means.

7. A camera according to claim 6, said thread means comprising a first thread means provided on the outer periphery of the movable barrel for securing the movable barrel to the stationary barrel.

8. A camera according to claim 7, said thread means comprising a second thread means provided on the inner periphery of the movable barrel for securing the movable barrel to the photographing lens barrel.

9. A camera according to claim 8, wherein said first thread means for thread the movable barrel to the stationary barrel is operable only when the movable barrel is positioned at the waterproof position.

10. A camera according to claim 9, wherein said first securing means for thread the movable barrel to the stationary barrel is operable only when the second thread means for securing the movable barrel to the photographing lens barrel does not operate.

11. A camera according to claim 10, further comprising a seal member which establishes a watertight connection between the outer periphery of the movable barrel and the inner periphery of the opening when the movable barrel is integrally connected to the inner periphery of the opening.

12. A camera according to claim 9, wherein said second thread means for securing the movable barrel to the photographing lens barrel is operable when the first thread means for securing the movable barrel to the opening does not operate.

13. A camera comprising:

an opening which is formed in a stationary barrel of a camera body;

a waterproofing cover which is movable in an optical axis direction through the opening to a projected position, said cover being provided on its front end with a transparent waterproof member a securing means for securing the waterproofing cover to the stationary barrel when the waterproofing cover is positioned at the projected position, said securing means comprising a male thread portion which is provided on a rear end of an outer periphery of the waterproofing cover in the optical axis direction, and a female thread portion which is provided on an inner periphery of the stationary barrel in the vicinity of the opening, said male and female thread portions being separable from each other when said waterproofing cover is not at the projected position and being in engagement with each other to secure said waterproofing cover at the projected position; and a sealing means which establishes a watertight connection between the opening and the waterproofing cover when the waterproofing cover is secured by the securing means at the projected position.

* * * * *

UNITED STATES PATENT AND TRADEMARK OFFICE
CERTIFICATE OF CORRECTION

PATENT NO. : 5,212,509
DATED : May 18, 1993
INVENTOR(S) : Kosei KOSAKO et al.

It is certified that error appears in the above-indentified patent and that said Letters Patent is hereby corrected as shown below:

On the title page item [54], change "HAVING A, MOVABLE LENS. BARREL" to ---HAVING A MOVABLE LENS BARREL---.

At column 5, line 26 (claim 9, line 2) of the printed patent, change "thread" to ---securing---.

At column 5, line 30 (claim 10, line 2) of the printed patent, change "securing" to ---thread---.

At column 5, line 30 (claim 10, line 2) of the printed patent, change "thread" to ---securing---.

Signed and Sealed this

Third Day of October, 1995

Attest:

BRUCE LEHMAN

*Attesting Officer*  *Commissioner of Patents and Trademarks*